United States Patent
Beerda et al.

(10) Patent No.: US 7,419,721 B2
(45) Date of Patent: Sep. 2, 2008

(54) SIZING COMPOSITION AND GLASS FIBER REINFORCED THERMOPLASTIC RESIN

(75) Inventors: Henri Beerda, Assen (NL); Ronald Boelman, Stadskanaal (NL); Jacob Cornelis Dijt, Elede (NL); Bertho van de Heisteeg, Vries (NL); Johannes Leonardus Tabak, Zuidhorn (NL)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/741,273

(22) Filed: Dec. 19, 2003

(65) Prior Publication Data

US 2005/0136237 A1    Jun. 23, 2005

(51) Int. Cl.
*B32B 27/02*    (2006.01)

(52) U.S. Cl. .......................... 428/391; 8/115.6; 65/443; 65/444; 65/447; 65/448; 428/364; 428/378; 428/392; 525/123; 525/124; 525/127; 525/128; 525/455

(58) Field of Classification Search ........................ None
See application file for complete search history.

(56) References Cited

U.S. PATENT DOCUMENTS

| | | | |
|---|---|---|---|
| 4,148,772 A | 4/1979 | Marchetti et al. | |
| 5,229,458 A | 7/1993 | Schimmel et al. | |
| 5,236,982 A | 8/1993 | Cossement et al. | |
| 6,365,272 B1 | 4/2002 | Masson et al. | |
| 6,407,157 B2 | 6/2002 | Oyamada et al. | |
| 2004/0209991 A1 * | 10/2004 | Piret et al. | 524/548 |

FOREIGN PATENT DOCUMENTS

| | | |
|---|---|---|
| EP | 0 356 655 B1 | 3/1990 |
| JP | 60-46951 | 3/1985 |
| JP | 6004695 | 3/1985 |
| JP | 02249559 | 10/1990 |
| JP | 9-301745 | 11/1997 |
| JP | 9-301745 A * | 11/1997 |

OTHER PUBLICATIONS

Paint and Surface Coatings—Theory and Practice, 2nd Edition; authored by Bentley; edited by Lambourne et al., Woodhead Publishing, 1999, pp. 70-72.*
PCT Search Report, corresponding to PCT/US2004/041731, mailed on Jul. 29, 2005.

* cited by examiner

*Primary Examiner*—Marc S Zimmer
(74) *Attorney, Agent, or Firm*—Dennis Millman

(57) ABSTRACT

The present invention is directed to sizing compositions for glass fibers and glass fiber reinforced thermoplastic resins. The sizing composition comprises a maleic anhydride copolymer. Thermoplastic polyamide resin articles reinforced with glass fibers at least partially coated with a residue of the sizing composition can demonstrate a surprising improvement in strength of the reinforced polyamide resin when lubricated with a fatty acid metal salt and in the hydrolysis resistance when exposed to boiling water/ethylene glycol medium.

26 Claims, No Drawings

SIZING COMPOSITION AND GLASS FIBER REINFORCED THERMOPLASTIC RESIN

FIELD OF INVENTION

The present invention is directed to sizing compositions and glass fiber reinforced thermoplastic resins.

BACKGROUND

Glass fibers are typically treated after forming with a sizing composition that can impart desired properties. As used herein the term "size", "sized", "sizing" and "sizing composition" means a coating composition that can be applied to the glass fibers after formation of the fibers. After their formation and treatment, the sized glass fibers can be gathered into bundles or strands comprising a plurality of individual fibers. The strands may be wound into a spool or "forming package." The forming packages can be dried to remove moisture from the fibers.

A sizing composition can serve several functions. It can function as a lubricant and binding agent and can protect fibers from abrasion with each other.

A sizing composition can also improve the performance of fibers during further processing such as when used to reinforce thermoplastic resins. For example, thermoplastic resins can be reinforced with sized glass fibers to strengthen and stiffen the resulting composite material. The sizing on the glass fibers can improve compatibility between the inorganic surface of glass fibers and an organic thermoplastic resin.

Many glass fiber reinforced thermoplastic resins are used in the automotive industry. For example, glass fiber reinforced polyamide resins are used to fabricate containers for various automotive fluids such as oil pans and radiator parts that encapsulate the core of the radiator. The combination of high temperatures and exposure to aqueous organic solvent mixtures such as ethylene glycol and water can decrease the strength of polyamide resins used in automotive applications. Specifically, a polyamide resin can be weakened by hydrolysis of the amide bonds of the polyamide.

Thus, it would be advantageous to provide a sizing composition that can improve the hydrolysis resistance of a glass fiber reinforced thermoplastic resin. It would also be advantageous to provide a sizing composition that can improve or maintain the strength of a glass fiber reinforced thermoplastic resin when lubricated with a fatty acid metal salt.

SUMMARY OF INVENTION

An embodiment of the present invention relates to a sizing composition comprising a maleic anhydride copolymer comprising maleic anhydride monomer and copolymerizable monomer, wherein a portion of the maleic anhydride copolymer is chemically modified by ammonia or a primary alkyl amine.

Another embodiment of the present invention relates to a sizing composition comprising a maleic anhydride copolymer comprising maleic anhydride monomer, copolymerizable monomer, and monomer selected from the group consisting of maleimide monomer, alkyl substituted maleimide monomer, and mixtures thereof.

Another embodiment of the present invention relates to a sizing composition comprising a blocked isocyanate and a maleic anhydride copolymer comprising maleic anhydride monomer and copolymerizable monomer, wherein a portion of the maleic anhydride copolymer is chemically modified by ammonia or a primary alkyl amine.

Another embodiment of the present invention relates to a sizing composition comprising a blocked isocyanate and a maleic anhydride copolymer comprising maleic anhydride monomer, copolymerizable monomer, and monomer selected from the group consisting of maleimide monomer, alkyl substituted maleimide monomer, and mixtures thereof.

Another embodiment of the present invention relates to a sizing composition comprising a blocked isocyanate and a maleic anhydride copolymer comprising maleic anhydride monomer and monomer selected from the group consisting of ethylene, butadiene, methyl vinyl ether, and mixtures thereof.

Another embodiment of the present invention relates to a sizing composition comprising a blocked isocyanate and a maleic anhydride copolymer consisting of maleic anhydride monomer and isobutylene.

Another embodiment of the present invention also relates to glass fibers at least partially coated with the residue of a sizing composition of the present invention.

The present invention also relates to glass fiber reinforced thermoplastic resins wherein the glass fiber is at least partially coated with the residue of a sizing composition of the present invention.

Thermoplastic polyamide resin articles reinforced with glass fibers at least partially coated with the residue of a sizing composition of the present invention can demonstrate a surprising improvement in the strength of the reinforced polyamide resin when lubricated with a fatty acid metal salt and in hydrolysis resistance when exposed to a boiling water/ethylene glycol medium.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

It is further noted that, as used in this specification, the singular forms "a," "an," and "the" include plural referents unless expressly and unequivocally limited to one referent.

In an embodiment, a sizing composition of the present invention comprises a maleic anhydride copolymer.

In another embodiment, a sizing composition of the present invention comprises a blocked isocyanate and a maleic anhydride copolymer.

Thermoplastic polyamide resin articles reinforced with glass fibers at least partially coated with the residue of a sizing composition of the present invention can demonstrate a surprising improvement in the strength of the reinforced polyamide resin when lubricated with a fatty acid metal salt and in hydrolysis resistance when exposed to a boiling water/ethylene glycol medium.

Embodiments of the sizing composition of the present invention comprise a maleic anhydride copolymer. In an embodiment, the maleic anhydride copolymer comprises maleic anhydride monomer and monomer selected from the group consisting of ethylene, butadiene, methyl vinyl ether, and mixtures thereof. In another embodiment, the maleic anhydride copolymer comprises maleic anhydride monomer and monomer selected from the group consisting of ethylene, butadiene, and mixtures thereof. In another embodiment, the maleic anhydride copolymer consists of maleic anhydride monomer and isobutylene.

In another embodiment, the maleic anhydride copolymer comprises maleic anhydride monomer and copolymerizable monomer, wherein a portion of the maleic anhydride copolymer is chemically modified by ammonia or a primary alkyl amine. In another embodiment, the maleic anhydride copolymer comprises maleic anhydride monomer and copolymerizable monomer, wherein a portion of the maleic anhydride copolymer is chemically modified by ammonia. In another embodiment, the maleic anhydride copolymer comprises maleic anhydride monomer and copolymerizable monomer, wherein the maleic anhydride copolymer is chemically modified by a primary alkyl amine. Chemically modifying a portion of the maleic anhydride copolymer with ammonia can convert a portion of the maleic anhydride monomers to maleimide monomers. Chemically modifying a portion of the maleic anhydride copolymer with a primary alkyl amine can convert a portion of the maleic anhydride monomers to alkyl substituted maleimide monomers.

In another embodiment, the maleic anhydride copolymer comprises maleic anhydride monomer, copolymerizable monomer, and monomer selected from the group consisting of maleimide monomer, alkyl substituted maleimide monomer, and mixtures thereof. In another embodiment, the maleic anhydride copolymer comprises maleic anhydride monomer, copolymerizable monomer, and maleimide monomer. In another embodiment, the maleic anhydride copolymer comprises maleic anhydride monomer, copolymerizable monomer, and alkyl substituted maleimide monomer.

As used herein, the term "maleic anhydride monomer" includes maleic anhydride and maleic acid in the free acid, salt, or partial salt form. As used herein, the term "partial salt" refers to maleic anhydride monomers having two carboxy groups where one carboxy group is in the free acid form and one carboxy group is converted to a salt. As used herein, the term "maleimide monomer" includes maleimide, maleic diamide, and maleic acid amide in the free acid or salt form. As used herein, the term "alkyl substituted maleimide monomer" includes N-alkyl maleimide, N,N'-dialkyl maleic diamide, and N-alkyl maleic acid amide in the free acid or salt form.

The maleic anhydride copolymer can be formed from the polymerization of maleic anhydride or maleic acid with a copolymerizable monomer such as, but not limited to, ethylene, butadiene, methyl vinyl ether, and isobutylene. As previously described, the maleic anhydride copolymer may also include terpolymers comprising maleic anhydride monomer, copolymerizable monomers, and monomer selected from the group consisting of maleimide monomer, alkyl substituted maleimide monomer, and mixtures thereof. The ratio of monomers in the maleic anhydride copolymer is not particularly limited, so long as the maleic anhydride copolymer is operable to maintain or improve the hydrolysis resistance and/or strength of a reinforced thermoplastic resin. In embodiments where the maleic anhydride copolymer is formed from a reaction mixture comprising maleic anhydride and a copolymerizable monomer, the resulting maleic anhydride copolymer can be in many instances an alternating copolymer of the two reactants. Further chemical modification of the alternating maleic anhydride copolymer produces maleic anhydride copolymers where the ratio of maleic anhydride, maleimide, and N-substituted maleimide monomers to a copolymerizable monomer is 1:1.

An aqueous solution of the maleic anhydride copolymer may be used when formulating the sizing composition. For maleic anhydride copolymers having maleic anhydride monomers in the anhydride form, the maleic anhydride copolymer may be poorly soluble when dispersed in water at room temperature. The solubility of the maleic anhydride copolymer can be improved by heating an aqueous solution of the maleic anhydride copolymer and converting anhydride groups of the maleic anhydride copolymer to the corresponding polyacids. The aqueous solution formed by the hydrolysis may then be used to formulate the sizing composition. Upon hydrolysis, any free acid groups of the maleic anhydride copolymer can be further converted from the free acid to a salt. In an alternate method of preparing an aqueous solution of the maleic anhydride copolymer, maleic anhydride copolymers having maleic anhydride monomers in the anhydride form can be heated in an aqueous solution of ammonium hydroxide or an aqueous solution of a primary alkyl amine. The reaction mixture may be heated under pressure to temperatures above 100° C. Depending on the reaction conditions and whether ammonium hydroxide or a primary alkyl amine is present, some or all of the anhydride groups may be converted to polyacids, salts, partial salts, diamides, partial amides, imides, and mixtures thereof. Formation of diamides, partial amides, and imides in the maleic anhydride copolymer may provide maleic anhydride copolymers having optimized affinity for reacting with the amine-terminal group of a polyamide resin through a transamidation reaction mechanism. Further, substitution of amides or imide groups for polyacid salts in the maleic anhydride copolymer may provide maleic anhydride copolymers having a reduced reactivity toward any fatty acid metal salt lubricant while maintaining reactivity for a polyamide resin.

A salt of the hydrolyzed maleic anhydride may be that of alkali metal or ammonium salts either derived from ammonium hydroxide or from an organic primary, secondary or tertiary amine poly- or monofunctionalized, e.g. triethylamine and triethanolamine. The degree of neutralization of the hydrolyzed maleic anhydride can vary. In an embodiment, a maleic anhydride copolymer is neutralized with a 25% ammonium hydroxide aqueous solution.

As used herein, the term "copolymerizable monomer" refers to materials that can be copolymerized with maleic anhydride and include, but are not limited to, aliphatic olefins, vinyl ethers, vinyl acetates, and other vinyl type monomers. The copolymerizable aliphatic olefins are of the general formula:

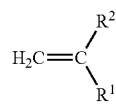

wherein $R^1$ and $R^2$ are each independently selected from the group consisting of hydrogen, alkyl, and alkenyl groups having from 1 to 12 carbon atoms. Examples of aliphatic olefins suitable for copolymerizing with maleic anhydride are ethylene, butadiene, and isobutylene. An example of a vinyl ether suitable for copolymerizing with maleic anhydride is methyl vinyl ether.

As used herein, the term "primary alkyl amine" refers any compound that includes a primary amine and that is suitable for chemically modifying the maleic anhydride copolymer. Suitable primary alkyl amines may generally include butylamine, isobutylamine, propylamine, isopropylamine, ethylamine, methylamine and pentylamine, aliphatic polyamines, such as N,N-dimethylaminopropylamine, N,N-dimethylaminoethylamine, N,N-diethylaminopropylamine, N,N-diethylaminoethylamine and the like, or primary aminoalcohols such as 2-aminoethanol, 3-aminopropanol and the like.

The amount and type of maleimide monomer or N-substituted maleimide monomer in the maleic anhydride copolymer may be determined by considerations such as a desired reactivity of the maleic anhydride copolymer with a particular polyamide resin or a desired viscosity for the sizing composition. For example, a greater number of amide or imide groups in a maleic anhydride copolymer may increase the reactivity of the maleic anhydride copolymer with the amino terminal groups of a polyamide resin. Further, a greater number of amide or imide groups in a maleic anhydride copolymer may reduce the solubility of the maleic anhydride copolymer in aqueous solution. Acid derivatives such as esters may not provide acceptable reactivity with a polyamide resin relative to amides, imides, anhydrides, free acids, and salts.

In an embodiment, the maleic anhydride copolymer is an alternating copolymer of maleic anhydride monomer and ethylene. An alternating copolymer of maleic anhydride and ethylene can be purchased from Zeeland Chemicals, Inc. In another embodiment, the maleic anhydride copolymer is an alternating copolymer of maleic anhydride monomer and butadiene. An alternating copolymer of maleic anhydride and butadiene known as MALDENE 286 can be purchased from Lindau Chemicals, Inc. In another embodiment, the maleic anhydride copolymer is an alternating copolymer of maleic anhydride monomer and methyl vinyl ether. In another embodiment, the maleic anhydride copolymer is an alternating copolymer of maleic anhydride monomer and isobutylene. An alternating copolymer of maleic anhydride monomer and isobutylene known as IREZ 160 may be purchased from International Specialty Products.

The amount of maleic anhydride copolymer in the sizing composition may depend upon various factors. For example, the lower limit of maleic anhydride copolymer may be determined by the amount effective to maintain or improve hydrolysis resistance of a reinforced thermoplastic resin. In an embodiment where sized glass fibers are to be used to reinforce a thermoplastic polyamide resin, the amount of maleic anhydride copolymer in the sizing composition effective to maintain or improve hydrolysis resistance of the thermoplastic polyamide resin may be greater than 1% by weight based on total solids. The lower limit of maleic anhydride copolymer also may be determined by the minimum amount operable to provide suitable reactivity with a polyamide resin. The upper limit of maleic anhydride copolymer may be determined by a viscosity of the wet sizing composition suitable for application to glass fibers. In an embodiment, the amount of maleic anhydride copolymer that can provide a wet sizing composition having a useful viscosity may be less than 30% by weight based on total solids. In another embodiment, the amount of maleic anhydride copolymer in the sizing composition ranges from 5 to 20% by weight based on total solids.

Embodiments of the sizing composition of the present invention may comprise a blocked isocyanate. As used herein, the term "blocked isocyanate" refers to any isocyanate where the isocyanate groups have been reacted with a compound so that the resultant blocked isocyanate is stable to active hydrogens at 25° C., and reactive with active hydrogens at a temperature below the temperature at which any film-former present in the sizing composition reacts. Two or more blocked isocyanates may be used jointly.

In the preparation of the blocked organic isocyanates, any suitable organic polyisocyanate may be used. A suitable organic polyisocyanate may be determined by the polyisocyanate's ability to form cross links with a film-former in a sizing composition, by the polyisocyanate's ability to interact with a polyamide resin, and/or by the polyisocyanate's ability to interact with the maleic anhydride copolymer, such as, but not limited to, during drying of the sizing composition and during extrusion. Representative examples of organic polyisocyanates which may be suitable organic polyisocyanates are aliphatic compounds such as trimethylene, tetramethylene, hexamethylene and butylidene diisocyanate, or the necessary to form isophorone diisocyanate (IPDI); cycloalkylene compounds such as 1,4-cyclohexane diisocyanate; aromatic compounds such as p-phenylene diisocyanate; aliphatic-aromatic compounds such as 4,4'-diphenylene methane diisocyanate, 2,4- or 2,6-tolylene diisocyanate or mixtures thereof. Representative examples of higher polyisocyanates are triisocyanates such as triphenylmethane-4,4',4"-triisocyanate and 2,4,6-triisocyanate toluene. Additional examples of organic polyisocyanates that may be used when practicing this invention include those of the biuret type and those for which a di- or trimerization reaction has produced four-, five- or six-membered rings. Among the six-membered rings, there may be mentioned the isocyanuric rings derived from a homo- or hetero-trimerization of various diisocyanates alone, with other isocyanate(s) (e.g., mono-, di- or polyisocyanate(s)) or with carbon dioxide. In this latter case, a nitrogen from the isocyanuric ring is replaced by an oxygen.

A suitable blocking agent may be determined by its ability to prevent the blocked isocyanate from reacting until a desired temperature is achieved. Representative examples of compounds which may be suitable blocking agents include, but are not limited to, oximes such as methyl ethyl ketoxime, acetone oxime and cyclohexanone oxime, lactams such as epsilon-caprolactam, and pyrazoles. Use of oximes, lactams, and pyrazoles is desirable because polyisocyanates blocked with oximes, lactams, and pyrazoles can unblock and react at lower temperatures relative to polyisocyanates blocked with alcohols.

In one embodiment where a polyamide resin is reinforced with glass fibers sized with the sizing composition of the present invention, the blocked isocyanate is an epsilon-caprolactam blocked aliphatic polyisocyanate aqueous emulsion from Bayer Chemical as NAJ-1058.

The amount of blocked isocyanate in the sizing composition may depend upon several factors such as, but not limited to, the blocking agent's compatibility with other components of the sizing composition, the type and amount of any film-former used in the sizing composition, and the useful viscosity of the sizing composition. For example, the lower limit of the amount of blocked isocyanate in the sizing composition may be determined by the amount effective to improve or maintain the strength of a reinforced thermoplastic resin. In an embodiment where the blocked isocyanate is an epsilon-caprolactam blocked polyisocyanate, the blocked isocyanate is present in an amount of less than 50% by weight based on total solids. In another embodiment where the blocked isocyanate is present in a 1:1 dispersion of epsilon-caprolactam blocked polyisocyanate and polyether-polyurethane, the blocked isocyanate is present in the sizing composition in an amount from 35 to 45% by weight based on total solids.

Embodiments of the sizing composition of the present invention may also comprise a film-forming material. The film-forming material can be selected from among a variety of art recognized materials for glass fiber sizings so long as it is compatible with the maleic anhydride copolymer and the blocked isocyanate in the sizing composition and/or compatible with any resin to be reinforced in any subsequent pressing.

Synthesis of film-forming polymers are well know to those skilled in the art and will not be discussed here. A comprehensive discussion can be found in "The Chemistry of Organic Film Formers", D. H. Solomon, Robert E. Krieger Publishing Company, 1977.

Examples of suitable film-forming materials include, but are not limited to, synthetic polymers that are thermoplastic or thermosetting. The specific film-former chosen may depend on the thermoplastic matrix resin to be reinforced or the type of fiber to be sized. For example, epoxy type film-formers may be used in sizing compositions used in reinforcing polyethylene or polybutylene terephthalate resins. In embodiments where thermoplastic polyamide resins are reinforced, various polyurethane dispersions may be useful such as aqueous solutions of polyurethane polymers formed by a reaction between an organic isocyanate or polyisocyanate and an organic polyhydroxylated compound or hydroxyl terminated polyether or polyester polymer. The polyurethane dispersion may contain a crosslinking group. An example of a suitable polyurethane film-former is a an aqueous emulsion of a polyether-polyurethane from Bayer Chemical as NAJ-1037. Further, the polyurethane may be part of a dispersion comprising a polyurethane and a blocked isocyanate. For example, the following polyurethane/blocked isocyanate emulsions may be suitable for use in the sizing compositions of the present invention: Witcobond 290H (Witco), Witcobond 60X (Witco), Baybond 403 (Bayer), Baybond PU-130 (Bayer), Baybond XP-7055 (Bayer), Nopco D641 (Henkel), Neoxil 6158 (DSM), and Vestanat EP-DS-1205 (Degussa)

The ratio of a film-former, such as polyurethane, to the blocked isocyanate is not particularly limited. In an embodiment where the blocked isocyanate comprises a caprolactam aliphatic blocked isocyanate and the film-former comprises a polyether-polyurethane, the ratio of blocked isocyanate to film-former can be 1:1.

The amount and type of film-forming material present in the sizing composition may be determined by various factors including, but not limited to, compatibility with the blocked isocyanate and maleic anhydride copolymer in the sizing composition, and the cost of a film-former such that the sized glass fibers are a commercially viable product. The lower limit of the amount of film-forming material may be determined by the lowest amount effective to protect the glass fibers from damage during processing or by the lowest amount effective to promote greater adhesion between the glass fibers. The upper limit of the amount of film-forming material may be determined by a viscosity of the wet sizing composition suitable for application to glass fibers or by the amount of blocked isocyanate and/or maleic anhydride copolymer necessary to provide acceptable hydrolysis resistance and strength in a reinforced polyamide resin. In an embodiment, the amount of film-former that can provide a wet sizing composition having a useful viscosity is less than 60% by weight based on total solids. In another embodiment, the amount of film-former is less than 45% by weight based on total solids. In another embodiment, the amount of film-former ranges from 35 to 45% by weight based on total solids.

Embodiments of the sizing composition of the present invention may also comprise a coupling agent. Silane coupling agents useful in the sizing composition comprise a functional group that is capable of chemically bonding with the surface of fiber glass and a second functional group that is capable of chemically bonding with a resin. Thus, a particular silane coupling agent included in the sizing composition may be determined by the thermoplastic resin in which sized glass fibers are used to reinforce. Two or more coupling agent can be used jointly. Examples of silane coupling agents potentially useful in embodiments of the sizing composition where a thermoplastic polyamide resin is reinforced are amino silanes such as aminopropyltrialkyloxy silanes such as γ-aminopropyltrimethoxysilane, γ-aminopropyltriethoxysilane, and diaminosilanes such as N-β(aminoethyl)γ-aminopropylmethyldimethoxysilane, N-β(aminoethyl)γ-aminopropyltrimethoxysilane and N-β(aminoethyl)γ-aminopropyltriethoxysilane. In an embodiment where the sized glass fibers are used to reinforce a polyamide resin, the coupling agent may comprise γ-aminopropyl triethoxysilane, such as DYNASYLAN AMEO, commercially available from DeGussa AG of Dusseldorf, Germany and A-1100 commercially available from Osi Specialties of Tarrytown, N.Y. In embodiments where a polyethylene or polybutylene terephthalate thermoplastic resin is reinforced, a suitable coupling agent may include an epoxysilane.

The amount of the coupling agent in the sizing composition may depend upon various factors such as, but not limited to, the type and amount of film-former that may be included in the sizing composition, the coupling agent's affinity for a particular resin, and the coupling agent's compatibility with the other components of the sizing composition. In an embodiment, the amount of coupling agent may be 10% by weight based on total solids. In another embodiment where the coupling agent comprises γ-aminopropyltriethoxysilane, the amount of coupling agent may range from 2 to 7% by weight based on total solids.

In embodiments where the sizing composition comprises a silane coupling agent, the sizing composition may further comprise a pH modifying agent. In an embodiment, a pH modifying agent, such as an alkyl carboxylic acid, may be used for pH control. For example, an aqueous acetic acid solution (80%) can be included to the sizing composition. A pH modifying agent may also be added to partially hydrolyze or activate a silane coupling agent. A pH modifying agent may also be included in sizing compositions that do not include a silane coupling agent.

Embodiments of the sizing composition may also comprise a surfactant suitable to stabilize a wet sizing composition. In one embodiment, the sizing composition may comprise a surfactant comprising a block copolymer of ethylene oxide and propylene oxide such as SYNPERONIC® PE/F108, which is commercially available from ICI Surfactants.

The amount and type of surfactant in the sizing composition may depend upon various factors such as, but not limited to, a surfactant's compatibility with the other components of the sizing composition and the amount effective to stabilize a wet sizing composition. In an embodiment, the amount of surfactant may be less than 10% by weight based on total solids. In an embodiment where the surfactant comprises a block copolymer of ethylene oxide and propylene oxide, the amount of surfactant may range from 0.1 to about 5% by weight based on total solids.

Embodiments of sizing compositions of the present invention may also comprise a lubricant. Lubricant can be used to reduce interfilament abrasion between the glass fibers and to reduce abrasion between the glass fibers and any contact points during processing. The lubricant may comprise any cationic, non-ionic, or anionic glass fiber lubricant or mixtures thereof compatible with the other components of the sizing composition. Examples of lubricants useful in the sizing composition include condensates of a fatty acid and polyethyleneimine and an amide substituted polyethylene imine. In an embodiment, the sizing composition may comprise a first lubricant comprising a partially amidated polyethyleneimine, such as EMERY® 6717, commercially available form Henkel Corporation of Kankakee, Ill., or Cognis Corporation of Cincinnati, Ohio, and a second lubricant comprising a carboxylic acid copolymer with ethylene oxide and alkyl side chains such as DAPRAL® GE202, commercially available from Akzo Nobel of Chicago, Ill.

The amount of lubricant included in the sizing composition may depend upon one or more factors such as, but not limited to, the amount sufficient to reduce interfilament abrasion, the amount sufficient to facilitate processability of the fiber glass in manufacturing operations, and the amount compatible with the other components of the sizing composition. In an embodiment, the amount of lubricant in the sizing composition may be less than 10% by weight based on total solids. In another embodiment, the lubricant may be present in an amount from 1 to 5% by weight based on total solids.

The binder may further comprise a carrier comprising any liquid or liquids compatible with the components of the sizing composition and the means of application of the sizing composition. In one embodiment, the carrier is water. In another embodiment, the carrier comprises one or more water miscible or water soluble organic liquids in conjunction with water. Generally, the carrier is present in an amount sufficient to provide a viscosity of sizing composition that facilitates application of a generally uniform coating of the glass fibers. In an embodiment where the sizing composition is applied to glass fibers using a kiss-roll applicator, a suitable viscosity for application to and even coating of glass fibers is less than or equal to 10 centipoise at 25° C. An amount of carrier sufficient to give a sizing composition having a viscosity of less than or equal to 10 centipoise at 25° C. can be an amount sufficient to give a total solids of less than 20 percent. In an embodiment, the carrier is present in an amount sufficient to give a total solids of between 5 and 15 percent.

The sizing composition may also comprises one or more other ingredients that are know to those skilled in the art to be useful in fiber glass sizings such as emulsifiers, biocide, defoamer, humectants, antioxidants, optical brighteners, and the like.

The type of glass fibers to be sized may be determined by various factors such as, but not limited to, the intended end use of the sized glass fibers. For example, the glass fibers may be any type so long as the glass fibers are compatible with a thermoplastic resin to be reinforced. In an embodiment, the glass fibers form a mat product used to reinforce a polyproplyene resin. In another embodiment, the glass fibers are of the type suitable for reinforcing a thermoplastic polyamide resin. Glass fibers suitable for reinforcing thermoplastic polyamide resins include chopped type fibers and long fibers, such as continuous rovings. The length and diameter of the chopped glass fibers used for reinforcing polyamide resins may be determine by various factors such as, but not limited to, the ease of handling when glass fibers are melt-kneaded with the polyamide resin, the reinforcing effect of the glass fibers, and glass fiber dispersing ability. In one embodiment, the length of glass fibers may be greater than 1 mm. In another embodiment, the length of glass fibers may be less than 50 mm. In another embodiment, the length of glass fibers may be between 3.175 mm (⅛ inch) and 12.7 mm (½ inch). In another embodiment, the average diameter of the glass fibers may be greater than 8 µm. In another embodiment, the average diameter of the glass fibers may be less than 25 µm.

The sized glass fibers may be combined with numerous different thermoplastic resins to form fiber glass reinforced thermoplastic resin articles. Examples of thermoplastic materials available include polyolefins, polyacetals, polyamides (nylons), polycarbonates, polystyrenes, styrene-acrylonitrile copolymers, acrylonitrile-butadiene styrene (ABS) copolymers, polyvinyl chloride (PVC), polyethylene terephthalates, polybutylene terephthalates, and blends of thermoplastic resins.

In an embodiment, the thermoplastic resin reinforced with sized glass fibers comprises a polyamide resin such as, but not limited to, polyamide 66, polyamide 46, polyamide 610, polyamide 612, polyamide 6T (polyhexamethylene terephthalamide) and polyamide 6I (polyhexamethylene isophthalamide) obtained by condensation polymerization of a diamine with a dicarboxylic acid; polyamide 6 and polyamide 12 obtained by ring-opening polymerization of a lactam; polyamide 11 obtained by self-condensation polymerization of an ω-aminocarboxylic acid; and copolymers and blends thereof. A particular polyamide resin may be chosen based on a resin's mechanical characteristics, heat resistance, crystallizing temperature, moldability and appearance of moldings.

The polyamide thermoplastic resins may be lubricated with a fatty acid metal salt such as sodium, lithium, calcium, magnesium, zinc or aluminum salt of a fatty acid having 9 or more carbon atoms such as capric acid, lauric acid, myristic acid, palmitic acid, stearic acid, behenic acid, cerotic acid, montanic acid, melissic acid, oleic acid and erucic acid. Also, two or more fatty acid metal salts may be jointly used. The fatty acid metal salt can be used to reduce torque during melt-kneading of the thermoplastic polyamide resin and sized glass fibers in an extruder, to improve the mold release characteristics of the resin, or improve the melt flow of the resin during injection molding. In one embodiment, calcium stearate is used to lubricate a polyamide resin to be reinforced with sized glass fibers. A caprolactam blocked isocyanate, as described in connection with sizing compositions of the present invention, can improve the strength of the calcium stearate lubricated polyamide resin.

Sizing compositions of the present invention can be prepared by addition of the components using any suitable method known to those skilled in the art. For example, the components may be added sequentially to each other, or they may be prediluted in a carrier before they are combined to form the sizing composition.

The sizing composition can be applied to glass fibers by suitable methods known to one of skill in the art such as, but not limited to, by contacting glass fibers with a static or dynamic applicator, such as a roller or belt applicator, or by spraying, or by other means. The overall concentration of the non-volatile components in the sizing composition can be adjusted over a wide range according to the means of application to be used, the character of the glass fiber to be sized, and the weight of dried size coating desired for intended use of the sized glass fibers.

The sizing composition can be applied to glass fibers in the forming operation of the fibers. After the sizing composition is applied to the continuous glass fibers, the fibers are dried to remove the carrier, and then chopped to a suitable length. Alternatively, after the sizing composition is applied to the continuous glass fibers, the fibers are chopped and then dried.

Continuous fiber glass strands may be chopped using techniques known to those of skill in the art including, but not limited to, direct chop processes and remote chop processes.

As discussed above, the length of chopped glass fiber can vary depending on various factors such as, but not limited to, the type of thermoplastic resin in which the chopped glass fiber will be used to reinforce and the intended use of a glass fiber reinforced thermoplastic resin article. As discussed above in embodiments where the sized chopped fiber is used to reinforce polyamide resins, the length may have a lower limit of 1 mm. Further, the sized chopped fiber used to reinforce polyamide resins may have an upper limit of length of 50 mm.

The sized glass fibers can be incorporated into thermoplastic resins in any suitable molding process known to those skilled in the art using either chopped strand, continuous strand, or mixtures thereof. The sized chopped fiber strands can be mixed with a thermoplastic resin in a dry powder mixture. The mixture can be compression or injection molded to produce a glass fiber reinforced thermoplastic resin article. The glass fiber reinforced thermoplastic resins may be used in molding processing such as injection molding, extrusion molding, blow molding or press molding.

EXAMPLES

Sizing compositions in examples 1-8 and comparative examples 10 and 11 were prepared using standard formulation techniques. Prior to preparing the sizing compositions in examples 1-2 and 4-8 and comparative example 10, an aqueous mixture of the respective maleic anhydride copolymer (ethylene/MA or isobutylene/MA) was prepared and used in the sizing composition. The aqueous mixtures were heated to between 90 and 100° C. under atmospheric pressure for about 2 hours followed by cooling and addition of a 25% aqueous solution of ammonium hydroxide.

Prior to preparing the sizing composition in example 9, an aqueous mixture of ammonium hydroxide and an ethylene maleic anhydride copolymer was heated to about 120° C. under pressure for about 0.5 to 1 hours. The resulting chemically modified maleic anhydride copolymer was incorporated into a sizing composition of the present invention and provided sizing compositions having performance characteristics similar to the sizing compositions of examples 1-8.

The sizing compositions in examples 1-9, and comparative examples 10 and 11 were applied using a kiss-roll type applicator to glass fiber strand material produced in a continuous in-line process.

The formed sized strands were then passed through a chopper to be cut into segments of about 4.5 mm and then dried.

TABLE 1

| | | Examples | | |
|---|---|---|---|---|
| Component | units | 1 | 2 | 3 |
| Maleic anhydride copolymer type | — | ethylene/MA[1] | ethylene/MA[1] | butadiene/MA[2] |
| Maleic anhydride copolymer amount | kg | 0.36 | 0.71 | 5.27 |
| Blocked isocyanate[8] | kg | 7.0 | 6.25 | 9.2 |
| PU[9] | kg | 7.0 | 6.25 | 9.2 |
| Silane coupling agent[3] | kg | 0.4 | 0.4 | 0.60 |
| Lubricant[4] | kg | 0.065 | 0.065 | 0.098 |
| Lubricant[5] | kg | 0.035 | 0.035 | 0.053 |
| Surfactant[6] | kg | — | — | 0.113 |
| Acetic Acid (80% active) | kg | 0.156 | 0.156 | 0.200 |
| Ammonia (25% active) | kg | 0.38 | 0.77 | 0.454 |
| Water | | Balance to 100 kg | Balance to 100 kg | Balance to 100 kg |

TABLE 2

| | | Examples | | Comparative example |
|---|---|---|---|---|
| Component | units | 4 | 5 | 10 |
| Blocked isocyanate[8] | kg | 16.7 | 8.45 | |
| PU[9] | kg | | 8.45 | 14.7 |
| Ethylene/MA copolymer[1] | kg | 0.44 | 0.44 | 0.44 |
| Silane coupling agent[3] | kg | 0.503 | 0.503 | 0.503 |
| Lubricant[4] | kg | 0.081 | 0.081 | 0.081 |
| Lubricant[5] | kg | 0.044 | 0.044 | 0.044 |
| Surfactant[6] | kg | 0.125 | 0.125 | 0.125 |
| Acetic acid (80%) | kg | 0.168 | 0.168 | 0.168 |
| Ammonia (25% active) | kg | 0.480 | 0.480 | 0.480 |
| Water | | Balance to 100 kg | Balance to 100 kg | Balance to 100 kg |

TABLE 3

| Component | units | Examples 6 | 7 | 8 |
|---|---|---|---|---|
| Maleic anhydride copolymer type | | isobutene/MA[9] | isobutene/MA[9] | isobutene/MA[9] |
| Maleic anhydride copolymer-amount | kg | 0.38 | 0.69 | 1.12 |
| Blocked isocyanate[8] | kg | 8.9 | 8.5 | 7.65 |
| PU[9] | kg | 8.9 | 8.5 | 7.65 |
| Silane coupling agent[3] | kg | 0.50 | 0.50 | 0.50 |
| Lubricant[4] | kg | 0.081 | 0.081 | 0.081 |
| Lubricant[5] | kg | 0.044 | 0.044 | 0.044 |
| Surfactant[6] | kg | 0.79 | 0.016 | 0.81 |
| Acetic Acid (80%) | kg | 0.168 | 0.168 | 0.168 |
| Water | | Balance to 100 kg | Balance to 100 kg | Balance to 100 kg |

TABLE 4

| Component | Units | Example 9 1 |
|---|---|---|
| Maleic anhydride copolymer type | — | ethylene/MA[10] |
| Maleic anhydride copolymer amount | kg | 0.44 |
| Blocked isocyanate[8] | kg | 8.5 |
| PU[9] | kg | 8.5 |
| Silane coupling agent[3] | kg | 0.5 |
| Lubricant[4] | kg | 0.081 |
| Lubricant[5] | kg | 0.044 |
| Surfactant[6] | kg | 0.125 |
| Acetic Acid (80% active) | kg | 0.195 |
| Ammonia (25% active) | kg | 0.48 |
| Water | | Balance to 100 kg |

[1]Ethylene/MA - alternating copolymer of ethylene and maleic anhydride (EMA, from Zeeland Chemicals, Inc.)
[2]Butadiene/MA - alternating copolymer of butadiene and maleic anhydride (Maldene 286, from Lindau Chemicals, Inc.) provided as an aqueous solution of partially neutralized copolymer.
[3]Silane coupling agent - gamma-aminopropyl triethoxysilane (AMEO, from Degussa)
[4]Lubricant - partially amidated polyethylene imine (Emery ® 6717L, from Henkel)
[5]Lubricant - carboxylic acid copolymer with ethylene oxide and alkyl side-chains (Dapral ® GE202, from AKZO-Nobel).
[6]Surfactant - Block copolymer of ethylene oxide and propylene oxide (Synperonic PE/F108, from C.H. Erbsloh, Germany)
[7]Isobutene/MA = alternating copolymer of isobutylene and maleic anhydride (IREZ-160, from ISP)
[8]Caprolactam aliphatic blocked isocyanate - NAJ-1058 (Bayer Chemical)
[9]PU = polyether-polyurethane film former - NAJ-1037 (Bayer Chemical)
[10]Ethylene/MA - a mixture alternating copolymer of ethylene and maleic anhydride (EMA, from Zeeland Chemicals, Inc.) chemically modified by ammonium hydroxide by heating to 120° C. under pressure for 1 hour.

Each of the dried 4.5 mm sized chopped glass fiber strands prepared in examples 1-3 and 6-9 was compounded with nylon 6,6 (Ultramid A3 from BASF) in a 70/30 weight to weight ratio of nylon to fiber glass and injection molded into standardized composite test bars.

The composite test bars were submerged for 120 hours in a boiling (approx. 135° C.) mixture of ethylene glycol and water (93/7 weight to weight ratio) and then tested to evaluate mechanical properties such as Tensile Strength, Unnotched Charpy, and Elongation at Break. These conditions were intended to simulate extreme hydrolysis conditions, for example in an automobile radiator, where wet strength of the composite is desirable at elevated temperature and pressure conditions.

Tensile properties (strength in MPa, and elongation at break in %) were measured according to ISO-527. Unnotched charpy impact strength (in $kJ/m^2$) was measured according to ISO-179.

Three separate experiments were run with the results of the various tests shown in Tables 5-7. Also, in Tables 5-7, comparative example 11 shows the results of the various tests for a nylon 6,6 (Ultramid A3) reinforced with glass fibers sized with a general purpose sizing composition containing a polyurethane/blocked isocyanate emulsion and not a maleic anhydride copolymer.

TABLE 5

Hydrolysis Test Results

| Component | units | Examples 1 | 2 | Comparative example 11 |
|---|---|---|---|---|
| Maleic anhydride copolymer type | — | ethylene/MA[1] | ethylene/MA[1] | — |
| Maleic anhydride copolymer amount | kg | 0.36 | 0.71 | — |
| Unnotched charpy | $kJ/m^2$ | 85.2 | 85.2 | 33.0 |
| Tensile strength | MPa | 90.1 | 88.5 | 54.2 |
| Elongation at break | % | 3.8 | 3.9 | 2.4 |

TABLE 6

Hydrolysis Test Results

| Component | units | Examples 3 | 6 | 7 | 8 | Comparative example 11 |
|---|---|---|---|---|---|---|
| Maleic anhydride copolymer type | — | butadiene/MA[2] | isobutene/MA[3] | isobutene/MA[3] | isobutene/MA[3] | — |
| Maleic anhydride copolymer amount | kg | 5.27 | 0.38 | 0.69 | 1.12 | — |
| Unnotched charpy | kJ/m[2] | 75.0 | 60.5 | 55.9 | 63.6 | 37.2 |
| Tensile strength | MPa | 90.4 | 76.3 | 72.1 | 82.1 | 56.4 |
| Elongation at break | % | 4.5 | 3.5 | 3.2 | 3.8 | 2.6 |

TABLE 7

Hydrolysis Test Results

| Component | units | Example 9 | Comparative example 11 |
|---|---|---|---|
| Maleic anhydride copolymer type | — | ethylene/MA[10] | — |
| Maleic anhydride copolymer amount | kg | 0.44 | — |
| Unnotched charpy | kJ/m[2] | 76.9 | 37.0 |
| Tensile strength | MPa | 90.3 | 57.4 |
| Elongation at break | % | 4.4 | 2.6 |

The results obtained indicate an increase in hydrolysis resistance and strength of the polyamide resin when the polyamide resin is reinforced with glass fibers sized with a sizing of the present invention. Specifically, each of the polyamide resins reinforced with the sizing compositions of examples 1-3 and 6-9 showed increased unnotched charpy, tensile strength, and elongation at break when compared to polyamide resins reinforced with a general purpose sizing composition containing a polyurethane/blocked isocyanate emulsion and not a maleic anhydride copolymer (comparative example 11).

In separate experiments, polyamide resins lubricated with calcium stearate were reinforced with glass fibers sized with examples 4-5 and 9 and with comparative example 10. Without subjecting the bars to treatment to an ethylene glycol/water bath, the composite test bars were tested for unnotched charpy, tensile strength, and elongation at break. Test results in Tables 8 and 9 showed that the presence of the blocked isocyanate in the sizings of examples 4-5 and 9 contributed to improving the strength of the test bars relative to polyamide resins reinforced with the sizing of comparative example 10, which does not include any blocked isocyanates.

TABLE 8

Calcium Stearate Dry As Molded Test Results

| Component | units | Examples 4 | 5 | Comparative example 10 |
|---|---|---|---|---|
| Blocked isocyanate[8] | kg | 16.7 | 8.45 | — |
| PU[9] | kg | — | 8.45 | 14.7 |
| Glass content | % | 30.0 | 29.7 | 29.5 |
| Unnotched charpy | kJ/m[2] | 77.3 | 74.4 | 71.8 |
| Tensile strength | MPa | 183.4 | 183.0 | 172.2 |
| Elongation at break | % | 3.4 | 3.4 | 3.1 |

TABLE 9

Calcium Stearate Dry As Molded Test Results

| Component | units | Example 9 | Comparative example 10 |
|---|---|---|---|
| Blocked isocyanate[8] | kg | 16.7 | — |
| PU[9] | kg | — | 14.7 |
| Glass content | % | 30.0 | 29.8 |
| Unnotched charpy | kJ/m[2] | 82.7 | 79.5 |
| Tensile strength | MPa | 171.1 | 170.7 |
| Elongation at break | % | 3.6 | 3.5 |

Desirable characteristics that can be exhibited by the present invention include, but are not limited to, providing hydrolysis resistance to a reinforced thermoplastic resin subjected to a boiling ethylene glycolwater bath. Another desirable characteristic that can be exhibited by the present invention is improving or maintaining the strength (tensile and/or impact) of a reinforced thermoplastic polyamide resin lubricated with a fatty acid metal salt lubricant.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

What is claimed is:

1. A sizing composition comprising a blocked isocyanate, an amino silane, and a maleic anhydride copolymer comprising maleic anhydride monomer and monomer selected from the group consisting of ethylene, butadiene, methyl vinyl ether, and mixtures thereof.

2. The sizing composition of claim 1, wherein the maleic anhydride copolymer comprises maleic anhydride monomer and monomer selected from the group consisting of ethylene, butadiene, and mixtures thereof.

3. The sizing composition of claim 1, wherein the blocked isocyanate comprises a caprolactam blocked polyisocyanate.

4. The sizing composition of claim 1, wherein the maleic anhydride copolymer is an alternating copolymer of maleic anhydride monomer and ethylene.

5. The sizing composition of claim 1, wherein the maleic anhydride copolymer is an alternating copolymer of maleic anhydride monomer and butadiene.

6. The sizing. composition of claim 1, further comprising a film-former.

7. The sizing composition of claim 6, wherein the film-former comprises polyurethane.

8. The sizing composition of claim 1, wherein the amino silane comprises a gamma-aminopropyltrialkyloxysilane.

9. The sizing composition of claim 1, further comprising a lubricant.

10. A glass fiber at least partially coated with the residue of the sizing composition of claim 1.

11. A plurality of glass fibers comprising at least one glass fiber of claim 10.

12. A glass fiber reinforced thermoplastic resin composition comprising a thermoplastic resin, and glass fibers at least partially coated with the residue of the sizing composition of claim 1.

13. A sizing composition comprising an amino silane and a maleic anhydride copolymer comprising maleic anhydride monomer and copolymerizable monomer, wherein a portion of the maleic anhydride copolymer is chemically modified by ammonia or a primary alkyl amine and wherein the copolymerizable monomer is selected from the group consisting of ethylene, butadiene, methyl vinyl ether, and mixtures thereof.

14. The sizing composition of claim 13, further comprising a blocked isocyanate.

15. The sizing composition of claim 14, wherein the blocked isocyanate comprises a caprolactam blocked polyisocyanate.

16. The sizing composition of claim 13, wherein the maleic anhydride copolymer comprises a maleic anhydride monomer and copolymerizable monomer, wherein a portion of the maleic anhydride copolymer is chemically modified by ammonia to convert a portion of the maleic anhydride monomers to maleimide monomers.

17. The sizing composition of claim 13, further comprising a film-former.

18. The sizing composition of claim 17, wherein the film-former comprises polyurethane.

19. The sizing composition of claim 13, wherein the amino silane comprises a gamma-aminopropyltrialkyloxysilane.

20. The sizing composition of claim 13, further comprising a lubricant.

21. A glass fiber at least partially coated with the residue of the sizing composition of claim 13.

22. A plurality of glass fibers comprising at least one glass fiber of claim 21.

23. A glass fiber reinforced thermoplastic resin composition comprising a thermoplastic resin, and glass fibers at least partially coated with the residue of the sizing composition of claim 13.

24. A sizing composition comprising a blocked isocyanate, an amino silane, and a maleic anhydride copolymer comprising maleic anhydride monomer and a copolymerizable straight chain aliphatic olefin of 2 to 12 carbon atoms.

25. The glass fiber reinforced thermoplastic resin composition of claim 12, wherein the thermoplastic resin comprises polyamide.

26. The glass fiber reinforced thermoplastic resin composition of claim 23, wherein the thermoplastic resin comprises polyamide.

* * * * *